(12) United States Patent
Hiroi et al.

(10) Patent No.: US 12,039,716 B2
(45) Date of Patent: Jul. 16, 2024

(54) DEFECT INSPECTION METHOD AND DEFECT INSPECTION DEVICE

(71) Applicant: Hitachi High-Tech Corporation, Tokyo (JP)

(72) Inventors: Takashi Hiroi, Tokyo (JP); Takahiro Urano, Tokyo (JP); Nobuaki Hirose, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 374 days.

(21) Appl. No.: 17/635,832

(22) PCT Filed: Aug. 23, 2019

(86) PCT No.: PCT/JP2019/033070
§ 371 (c)(1),
(2) Date: Feb. 16, 2022

(87) PCT Pub. No.: WO2021/038633
PCT Pub. Date: Mar. 4, 2021

(65) Prior Publication Data
US 2022/0301136 A1    Sep. 22, 2022

(51) Int. Cl.
*G06K 9/00* (2022.01)
*G06T 7/00* (2017.01)
(Continued)

(52) U.S. Cl.
CPC ............... *G06T 7/001* (2013.01); *G06T 7/13* (2017.01); *G06T 7/70* (2017.01); *G01N 21/9505* (2013.01);
(Continued)

(58) Field of Classification Search
CPC ............ G06T 7/001; G06T 7/13; G06T 7/70; G06T 2207/10061; G06T 2207/20016;
(Continued)

(56) References Cited

U.S. PATENT DOCUMENTS 7,415,362 B2 *  8/2008  Ueyama ................ G06T 7/0004
                                                    382/145
7,796,804 B2 *  9/2010  Bhaskar ........... G01N 21/95607
                                                    382/103
(Continued)

FOREIGN PATENT DOCUMENTS

JP      2005-351631 A    12/2005
JP      2008-20235 A      1/2008
(Continued)

OTHER PUBLICATIONS

International Search Report (PCT/ISA/210) issued in PCT Application No. PCT/JP2019/033070 dated Oct. 8, 2019 with English translation (three (3) pages).
Japanese-language Written Opinion (PCT/ISA/237) issued in PCT Application No. PCT/JP2019/033070 dated Oct. 8, 2019 (four (4) pages).

*Primary Examiner* — Shervin K Nakhjavan
(74) *Attorney, Agent, or Firm* — Crowell & Moring LLP

(57) ABSTRACT

The purpose of the present invention is to provide a defect inspection device with which it is possible to determine a defect candidate position more accurately than before, even when design data cannot be obtained or are difficult to be utilized sufficiently. The present invention solves the problem by: setting an appropriate reference die or reference chip over a wafer to be inspected; setting, with respect to each of swath channel die images obtained by dividing a reference die swath image into a plurality of portions and detecting the portions, one or more reference patterns; correcting a position error of a swath image obtained from another die to be inspected, using the reference pattern for each swath channel image; and performing defect detection using the corrected swath channel image.

8 Claims, 12 Drawing Sheets

(51) Int. Cl.
*G06T 7/13* (2017.01)
*G06T 7/70* (2017.01)
*G01N 21/95* (2006.01)
*G01N 23/2251* (2018.01)

(52) U.S. Cl.
CPC ..... *G01N 23/2251* (2013.01); *G01N 2223/07* (2013.01); *G01N 2223/401* (2013.01); *G01N 2223/507* (2013.01); *G06T 2207/10061* (2013.01); *G06T 2207/20016* (2013.01); *G06T 2207/30148* (2013.01)

(58) Field of Classification Search
CPC ........... G06T 2207/30148; G06T 7/168; G06T 7/0004; G01N 21/9505; G01N 23/2251; G01N 2223/07; G01N 2223/401; G01N 2223/507; G01N 2021/8861; G01N 21/95684; G01N 2021/8887; G01N 21/9501; G01N 21/8851; G01N 21/95607; G01N 2021/8854; G01N 2021/95615; G01N 2201/127; H01L 22/12
See application file for complete search history.

(56) References Cited

U.S. PATENT DOCUMENTS

| | | | |
|---|---|---|---|
| 8,559,001 B2 * | 10/2013 | Chang | H01L 22/12 |
| | | | 250/559.3 |
| 10,127,653 B2 | 11/2018 | Duffy et al. | |
| 10,365,232 B2 * | 7/2019 | Suman | G01N 23/2251 |
| 10,572,991 B2 * | 2/2020 | Chen | G06T 7/74 |
| 2005/0271261 A1 * | 12/2005 | Onishi | G06T 7/001 |
| | | | 382/218 |
| 2009/0037134 A1 * | 2/2009 | Kulkarni | G01N 21/9501 |
| | | | 702/127 |

FOREIGN PATENT DOCUMENTS

| | | | | |
|---|---|---|---|---|
| JP | 2009097958 A | * | 5/2009 | ........... G01N 21/956 |
| JP | 2011-222636 A | | 11/2011 | |
| JP | 2017-529684 A | | 10/2017 | |
| WO | WO-2011108045 A1 | * | 9/2011 | ............ H01J 37/265 |
| WO | WO 2017/163318 A1 | | 9/2017 | |

* cited by examiner

BEFORE OFFSET CALIBRATION

AFTER OFFSET CALIBRATION

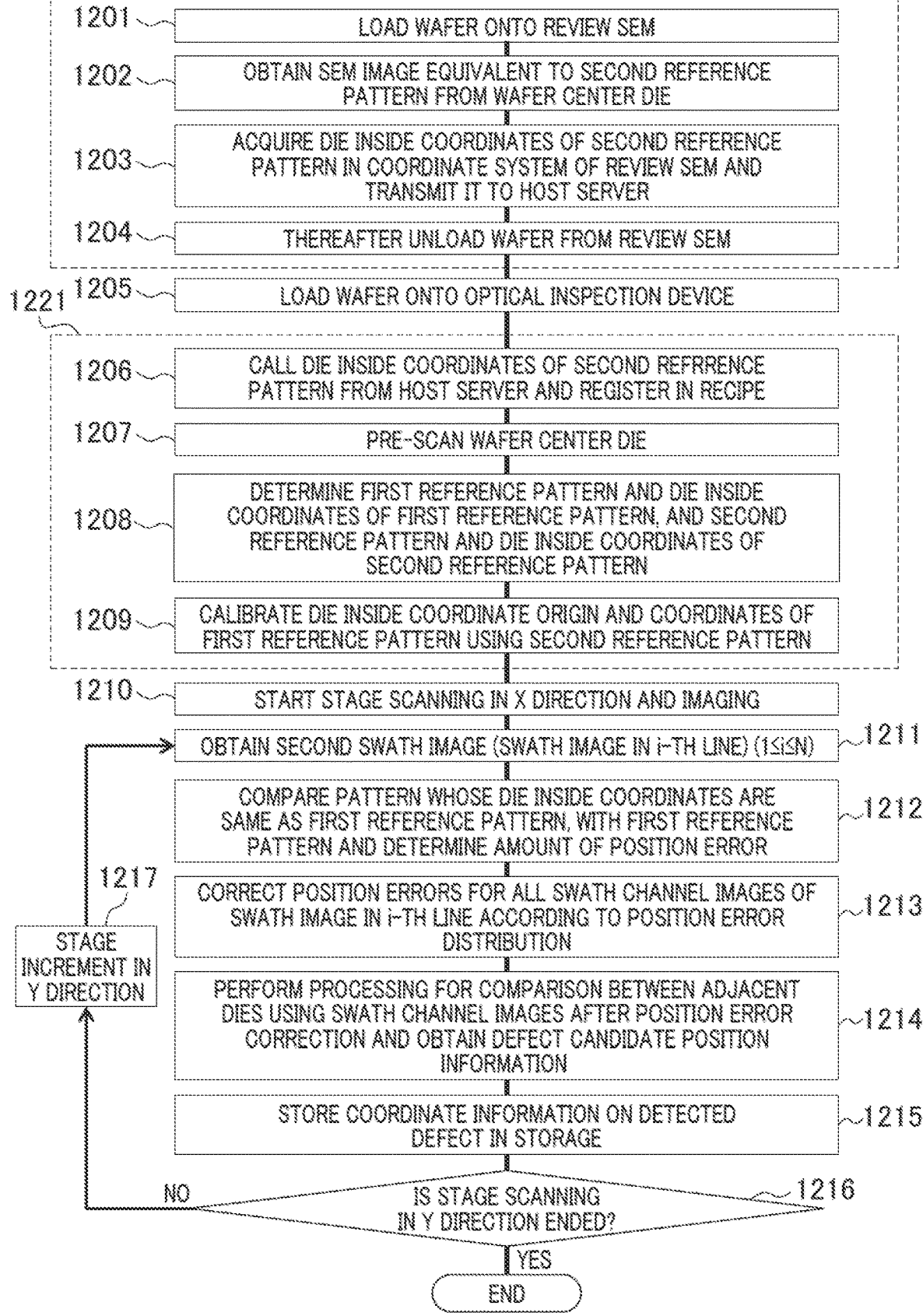

DEFECT INSPECTION METHOD AND DEFECT INSPECTION DEVICE

TECHNICAL FIELD

The present invention relates to a defect inspection device that detects position information on a defect present in a wafer and more particularly to an optical inspection device for a patterned wafer.

BACKGROUND ART

A semiconductor device is manufactured by performing various treatments on a silicon wafer. In the semiconductor manufacturing process, there are cases that at the step of forming a pattern on a silicon wafer, a pattern fault or defect that is different from a normal portion is formed unintentionally, leading to malfunctioning of the semiconductor device. Therefore, from the viewpoint of improving the yield rate, it is important to detect a pattern fault or defect, if any, different from a normal portion in-line and feed back the result to the semiconductor manufacturing process. The defect inspection device is a device that detects a defect on a semiconductor wafer as position information. The coordinate information of the detected defect is used to obtain an enlarged image of the defect through an observation device such as a review SEM (scanning electron microscope). The image obtained by the review SEM is used to identify the type of defect and the result is used for status management or the like in the manufacturing process. For example, it is used in a management method such as frequency distribution monitoring of the number of defects for each type of defect.

In an ordinary defect inspection device, the wafer placed on the stage is irradiated with light while the stage is being moved, then the scattering light or reflected light generated by light irradiation is detected to obtain an image and comparison operation is performed using the obtained image to detect a defect. For the method of comparison operation, various algorithms including algorithms for die comparison, cell comparison, and design data comparison have been developed. Here, die means a silicon wafer chip on which an integrated circuit is printed, cell means a region in which a minimum repetitive pattern is formed in a die.

As mentioned above, the defect inspection device is a device that acquires position information of a defect, it is very important to improve the defect position accuracy for improving the defect inspection accuracy and sharing the position information with the review SEM. However, the accuracy of defect coordinates detected by the defect inspection device deteriorates due to various factors such as wafer alignment error, stage moving speed fluctuation, and AD converter output fluctuation. Therefore, in the past, various techniques to improve the defect coordinate detection accuracy have been explored.

Patent Literature 1 discloses a technique that a reference chip is set on a wafer, a specific pattern in the reference chip is taken as a reference pattern, the image of a pattern equivalent to the reference pattern in the chip to be inspected is compared with the image of the reference pattern, and the difference between these images is taken as the amount of position error of each chip image to correct the position coordinates of the detected defect.

Patent Literature 2 discloses a technique that by aligning a patch image cut out from the image to be inspected with respect to design data, the coordinates of the patch image are converted into coordinates of the design data and the amount of deviation of the patch image is evaluated, using the alignment result.

Patent Literature 3 discloses an invention that in a semiconductor wafer macro inspection device, the sizes of an inspection image and a reference image are reduced by wavelet transformation (the number of pixels is reduced) and thereby the amount of calculation for comparison operation is decreased to increase the inspection speed.

CITATION LIST

Patent Literature

PTL 1: Japanese Unexamined Patent Application Publication No. 2011-222636
PTL 2: Japanese Unexamined Patent Application Publication (Translation of PCT Application) No. 2017-529684 (U.S. Pat. No. 10,127,653)
PTL 3: Japanese Unexamined Patent Application Publication No. 2008-020235

SUMMARY OF INVENTION

Technical Problem

In the technique described in Patent Literature 1, one reference pattern is set for a reference chip, namely a reference die. However, considering the recent tendency toward pattern size miniaturization, only one reference pattern set for a die is quite in sufficient from the viewpoint of accuracy. The technique described in Patent Literature 2 compares the image cut out from the physical layout pattern of a semiconductor chip with a patch image and calculates the amount of position difference, which assumes that all design data of the chip (or die) is available. However, design data is confidential information for a semiconductor device manufacturer and in many cases, an inspection device maker is not allowed to use the design data or cannot access the design data easily. The technique described in Patent Literature 3 is not intended in the first place to improve the detection accuracy.

The present invention has an object to provide a defect inspection method or defect inspection device that can improve the defect position accuracy without using design data.

Solution to Problem

The present invention solves the above problem by: setting an appropriate reference die or reference chip over a wafer to be inspected; setting one or more reference patterns with respect to each of swath channel die images obtained by dividing a reference die swath image into a plurality of portions and detecting the portions; correcting a position error of a swath image obtained from another die to be inspected, using the reference pattern, for each swath channel image; and performing defect detection using the corrected swath channel image.

Advantageous Effects of Invention

The present invention makes it possible to realize an inspection device or inspection method that provides higher defect candidate position accuracy than in the prior art, without using design data.

BRIEF DESCRIPTION OF DRAWINGS

FIG. 12 is a flowchart of defect inspection according to the third embodiment.

DESCRIPTION OF EMBODIMENTS

First Embodiment

Figure 1:
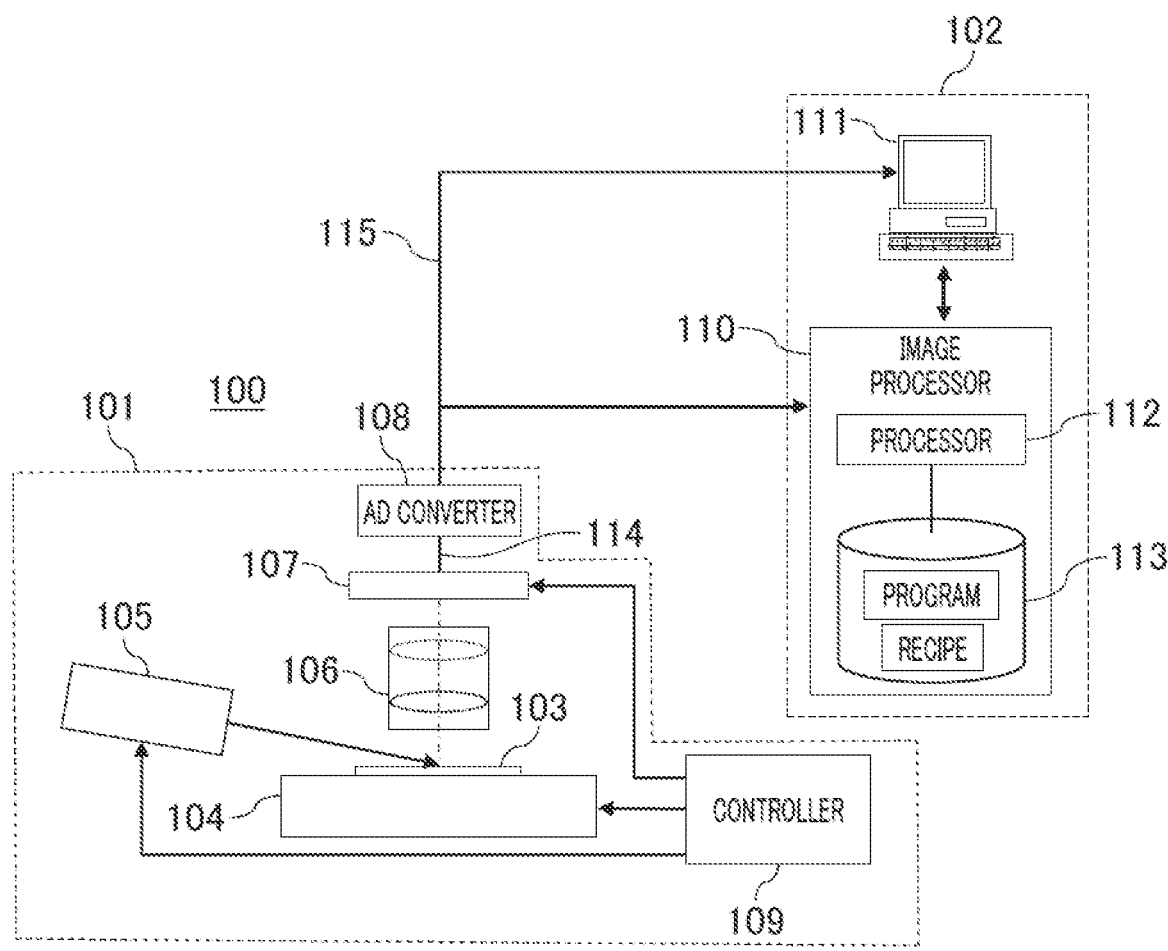
FIG. 1 is a configuration diagram of a defect inspection device according to a first embodiment.

FIG. 1 is a diagram that shows the configuration of a defect inspection device 100 according to the first embodiment. The defect inspection device 100 is a device that detects a defect (or a spot that may be a defect) in the pattern formed on a wafer 103, identifies the defect candidate position and outputs it as an inspection result. The defect inspection device 100 shown in FIG. 1 includes an image acquisition subsystem 101 to acquire an image of the wafer 103 and a computer subsystem 102 to extract position information on a defect candidate spot by processing the acquired image data.

The image acquisition subsystem 101 includes: a light source 105 to irradiate the wafer 103 with light; a detection optical system 106 to detect the scattering light or reflected light generated by irradiation of the wafer 103 with light; a sensor 107 to convert the signal light detected by the detection optical system 106 into an electric signal; an AD converter 108 to convert the analog electric signal from the sensor 107 into a digital signal; a plurality of signal channels 114 to transmit the scattering light or reflected light detected by the sensor 107 to the AD converter 108; a stage 104 on which the wafer 103 is placed and which moves the desired spot on the wafer 103 to the position for light irradiation by the light source 105; and a controller 109 and so on. The controller 109 controls operation of the constituent elements of the image acquisition subsystem 101 and the entire operation of the defect inspection device 100.

Here, in a dark field optical inspection, the light source is a laser and scattering light is detected as signal light. In a bright field inspection device, the light source is a broadband light source or the like and reflected light is detected as signal light. In an electron beam inspection device, an electron source is used instead of the light source and secondary electrons or reflected electrons that are generated by irradiating the wafer with an electron beam are detected. Thus, the image acquisition subsystem may be any of a dark field imaging device, a bright field imaging device and an electron beam imaging device. The first embodiment is described below by taking the case that the inspection device uses a dark field imaging device, as an example.

The computer subsystem 102 includes an image processor 110 and a control PC 111. The image processor 110 and control PC 111 are each connected to the computer subsystem via a fiber channel 115 and can receive a pixel signal output from the AD converter 108. The image processor 110 is a unit that generates a swath image of the wafer 103 using the output signal from the AD converter 108 and performs information processing for position error correction which will be explained later. Here, "swath image" is an image obtained by irradiating the wafer 103 by the light source 105 while continuously moving the stage 104 in one axis direction with the wafer 103 placed on it and it is data of a rectangular image that is long and thin in the moving direction of the stage 104. Simply "swath" means a long and thin region in which the laser is scanned by stage scanning and lighting from the light source 105.

In order to perform the above information processing, a processor 112 and a storage unit 113 are provided. The storage unit 113 is a device that stores various data to be used by the control PC 111 and image processor 110 and is constituted by large capacity storage means such as a magnetic disk. The storage unit 113 stores a program to be used for various processes and a recipe as software to set conditions such as an image acquisition method and an image method. In order to process a large volume of image data, the image processor 110 is often comprised of a parallel computer in which a plurality of processors are operated in parallel. The control PC 111 functions as a user interface to set various conditions for information processing for position error correction and defect inspection that will be explained later.

Figure 2:
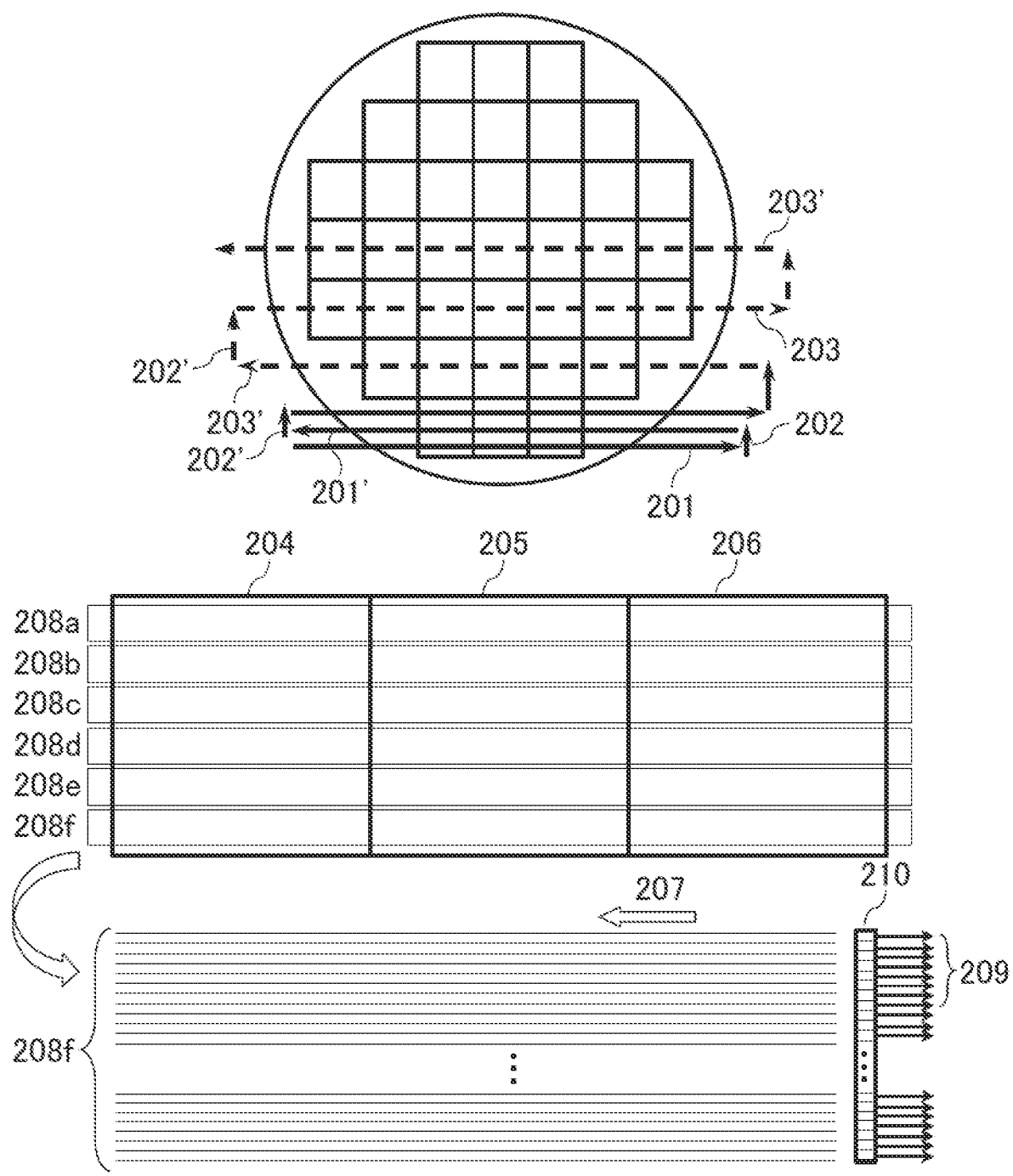
FIG. 2 is a schematic diagram that shows the relation between a wafer and a die, the relation between a die and a swath, and the relation between a swath and a swath channel.

FIG. 2 schematically shows the relation between a die formed on a wafer and stage scanning and the relation between a swath image and a swath channel image. The top diagram in FIG. 2 is a schematic diagram of a wafer on which 37 dies arranged as 7 rows by 7 columns are formed. Each die is given coordinates and specified by a matrix of rows and columns. Here, in stage scanning in the X direction, movement from left to right in the figure is defined as forward direction and movement from right to left is defined as reverse direction.

Stage scanning is started from the die in the bottom left corner of the wafer and proceeds in the direction indicated by reference number 201 to acquire a swath image. If the light irradiation position does not reach the dies in the uppermost row of the wafer when the light irradiation position for imaging reaches the die at the right end, the stage is moved in the Y direction indicated by reference number 202 for one swath, and then the stage is scanned in the reverse direction indicated by reference number 201' to acquire a swath image. When the light irradiation position reaches the die at the left end, the stage is scanned in the direction indicated by reference number 202' and in the same way as above, the stage is scanned in the forward direction along the X direction. As mentioned above, in order to acquire a swath image for one row of dies, stage scanning in the forward and reverse directions along the X direction must be repeated several times for imaging. The top diagram in FIG. 2 shows the wafer in a state in which stage scanning has been started from the left bottom die on the wafer in FIG. 2 and stage scanning for the dies up to halfway the fourth row of dies has been finished. However, if all the stage scanning directions were expressed by lines, the lines would be too intricate, so for the dies in the second and subsequent rows from bottom, scanning lines for each row of dies are expressed by one arrow in the diagram.

As mentioned above, for acquisition of an image of one die, one swath image is not sufficient and a plurality of swath images must be acquired. The reason is that while usually the semiconductor chip die size is approximately in the range from several millimeters square to several centimeters square, the light detection width of the sensor to detect scattering light or reflected light (8192 pixels) is at most 1.6 mm or so under the condition that the typical set resolution is 0.2 μm/pixel. The middle schematic diagram in FIG. 2 shows the relation between swath images of the dies in the fourth row from the bottom of the wafer shown in the top diagram in FIG. 2 and the dies. In order to acquire swath images of die 204 to die 206, a total of six swaths, swath 208a to swath 208f, are required. Die 205 corresponds to the center die of the wafer.

Furthermore, one swath image is divided and detected by a plurality of signal channels. For example, scattering light corresponding to swath 208f is detected by the sensor 210 and output signals for 8192 pixels are grouped into eight signal channels and transmitted to the AD converter at the later stage (108 in FIG. 1) as signal channels 209, each of which is a channel for 1024 pixels. In the embodiments described below, a swath image (namely a swath image whose pixel width in the Y direction is equivalent to 1024 pixels) corresponding to data transmitted by one signal channel will be called "swath channel image". Also, a region in which one swath channel is acquired will be called "swath channel". Furthermore, an image into which a swath image is cut out die by die will be called "swath die image" and an image into which a swath channel image is cut die by die will be called "swath channel die image". The bottom schematic diagram in FIG. 2 shows that the scattering light from a swath acquisition region comprised of a plurality of swath channels (corresponding to swath channel images 209) is detected by the sensor 210 and output as an analog output signal. Since the image data that can be recognized by the image processor 110 and control PC 111 of the computer subsystem 102 is digital data that has passed through the AD converter 108, in the explanation made hereinafter, a swath channel image or swath image is assumed to be pixel data quantized by the AD converter 108.

Figure 3:
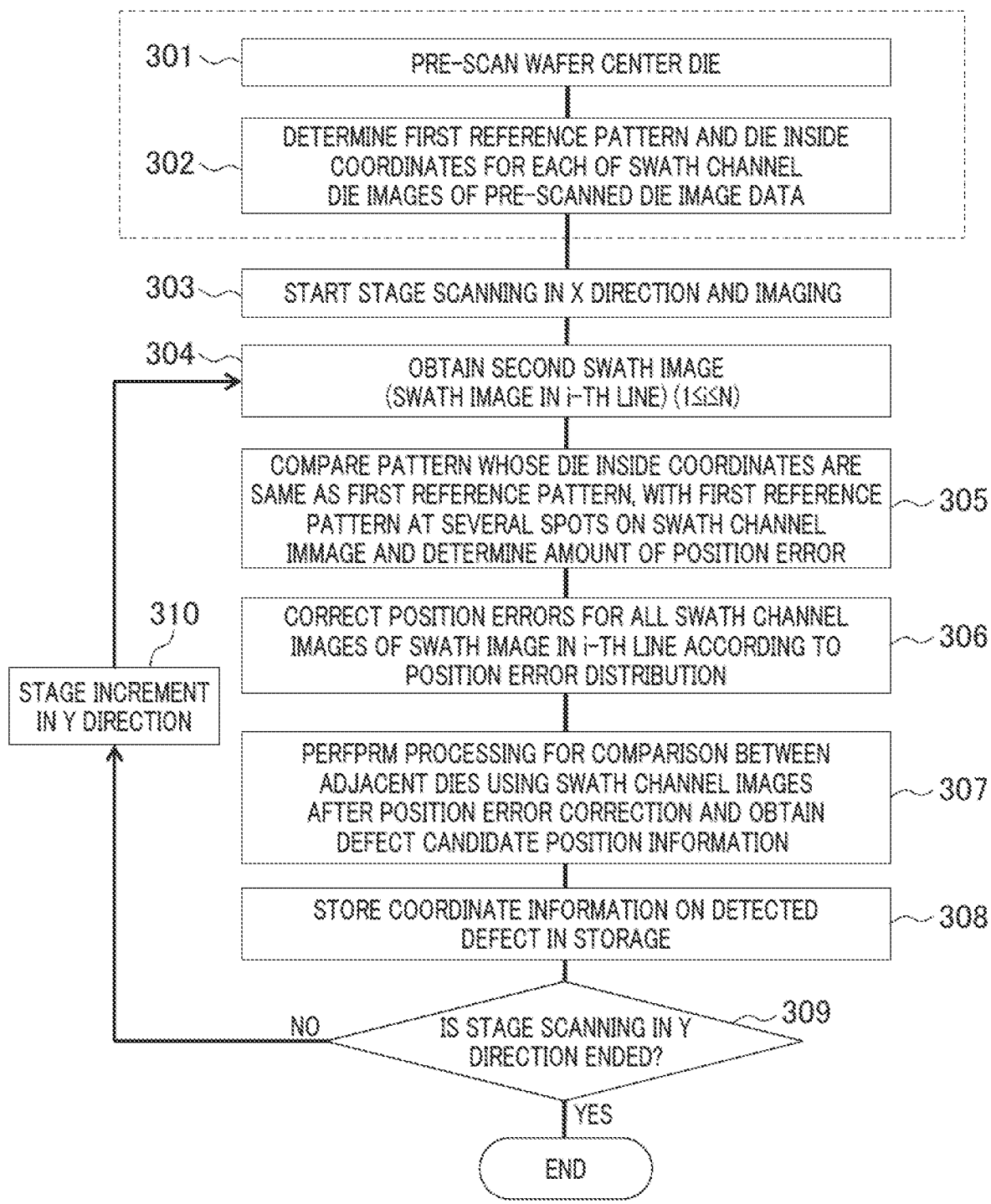
FIG. 3 is a flowchart of defect inspection according to the first embodiment.

Next, operation of the defect inspection device 100 according to this embodiment will be described referring to FIG. 3. In the description, reference will be made to FIG. 4, FIG. 5, FIG. 6, and FIG. 7 as necessary. FIG. 3 is a flowchart that shows operation of the defect inspection device 100 according to this embodiment. The flowchart shown in FIG. 3 is roughly divided into recipe setting steps enclosed by dotted line and main steps to perform defect inspection according to the conditions set by the recipe setting steps. The same recipe conditions can be used for wafers formed with the same pattern and thus once the recipe setting steps are carried out, it is unnecessary to carry out the recipe setting steps again. In the flowchart in FIG. 3, it is assumed that a wafer has already been loaded into the inspection device and placed on the stage.

First, at Step 301, the wafer center die is pre-scanned to acquire a swath image of the center die. The reason to acquire image data of the wafer center die is that the position error is least in the vicinity of the wafer center and to do so is most advantageous in extracting a first reference pattern, which will be explained later.

Figure 4:
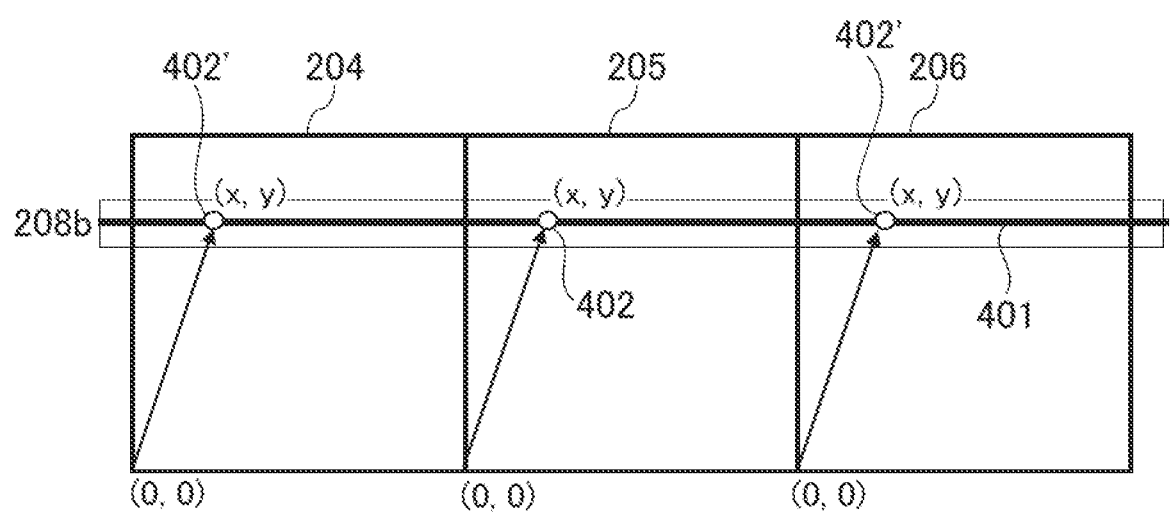
FIG. 4 is a schematic diagram that shows the concept of die inside coordinates.

Next, at Step 302, prescribed arithmetic processing is performed for each of swath channel images of the swath image to extract a first reference pattern and further determine die inside coordinates of the first reference pattern. Here, die inside coordinates mean inside coordinates to describe the pattern in a die that is set for each die. FIG. 4 schematically shows the relation among a swath, a swath channel and die inside coordinates. Dies 204 to 206 shown in FIG. 4 are the same dies as the row of dies shown in the middle schematic diagram in FIG. 2, only the swath 208b is extracted. The black solid line designated by reference number 401 indicates one of the swath channels of the swath 208b and actually the image of the swath 208b is constituted by swath channel images with 1024 pixels. In each die, inside coordinates are set with its left bottom corner as the origin (0, 0) and all the positions of pixels of the swath image or swath channel image can be expressed by die inside coordinates.

Next, an explanation will be made of a first reference pattern. The first reference pattern is a pattern to calibrate, per swath channel image, the position error of a swath image acquired from each die on the wafer according to the swath image acquired from a specific die. As explained above, in the first embodiment, this pattern is extracted from the swath image acquired from the wafer center die. As explained earlier, one swath image includes eight swath channel images each comprised of 1024 pixels and furthermore in the first embodiment, six swath images are required to acquire the whole image of a single die. At least one first reference pattern is required for each swath channel die image and 48 (=8×6) reference patterns are required for one whole die. In addition, if two or more reference patterns are set (for each swath channel die image) in order to improve the position error correction accuracy, the required number of reference patterns would be increased to 100 to 200 or so. It is very cumbersome to check and select many reference patterns visually each time the type of wafer to be inspected is changed. Therefore, first reference patterns have to be extracted mechanically without human intervention.

A swath channel die image is an aggregate of two-dimensional pixel data. Extraction of a pattern from two-dimensional pixel data comes down to finding pattern edges on a two-dimensional pixel array. In addition, since a first reference pattern is used to correct a position error, it should be a unique pattern (a pattern for which no other same pattern exists on the same swath channel die image). In the embodiment described below, a pattern edge extraction method using wavelet transformation will be explained.

Here, wavelet transformation is a mathematical approach that expands a signal in a certain time domain or spatial domain into a sum of localized waves in a series. The mathematical approach that performs wavelet transformation of a digital signal is discrete wavelet transformation. Discrete wavelet transformation is expressed by an algorithm that, after a low-frequency component obtained by decomposing an input digital signal into a high-frequency component and a low-frequency component is subjected to down-sampling (also called degeneracy) with a resolution of ½, a procedure for further decomposition into a high-frequency component and a low-frequency component is repeated as many times as desired. It is also called multi-resolution decomposition. When discrete wavelet transformation is performed on two-dimensional pixel data, the input image data is decomposed into pixel data having four types of frequency components, which are a low-frequency component, horizontal high-frequency component, vertical high-frequency component, and diagonal high-frequency component. The current image can be restored by inverse transformation of the decomposed image data, namely the low-frequency component image and high-frequency component.

Figure 5A:
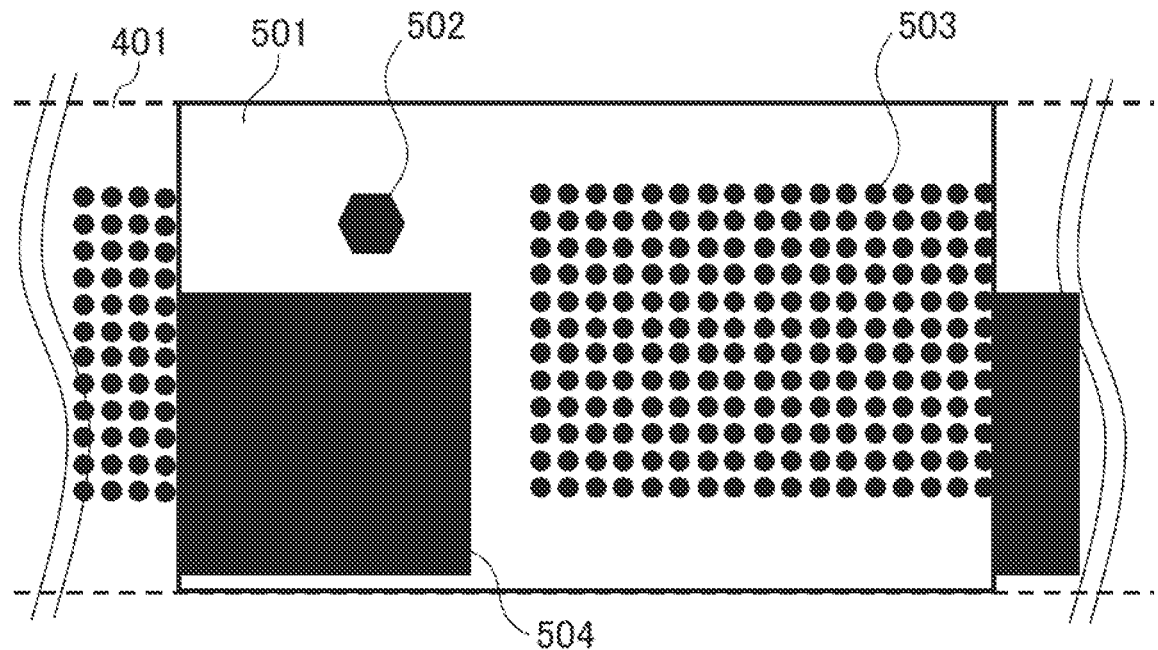
FIG. 5A is an enlarged view of a swath channel image of a wafer center die.
Figure 5B:
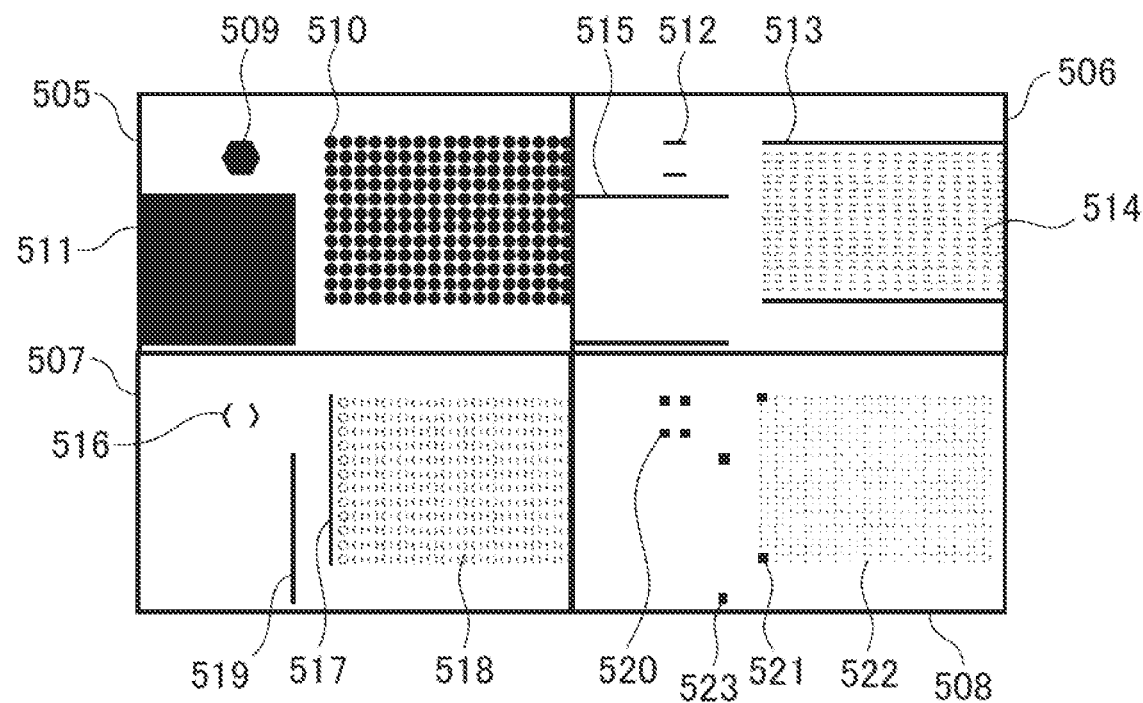
FIG. 5B is a conceptual diagram that shows an example of a multiresolution decomposition image of Level 1.
Figure 5C:
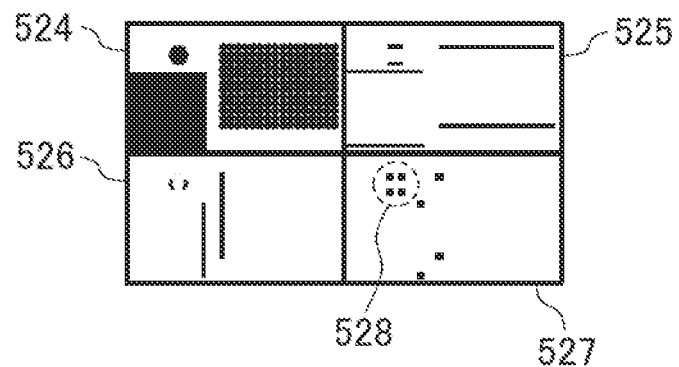
FIG. 5C is a conceptual diagram that shows an example of a multiresolution decomposition image of Level 2.

FIG. 5A to FIG. 5C show conceptual diagrams of the first reference pattern extraction algorithm that uses wavelet transformation. In FIG. 5A, reference number 501 indicates an enlarged view of swath channel die image 401 of the wafer center die 205. In the swath channel die image 401, three patterns, namely patterns 502, 503, and 504, are formed and the same patterns are also formed in the swath channel die image of an adjacent die. FIG. 5B shows images that are obtained by performing discrete wavelet transformation of the swath channel die image 501 shown in FIG. 5A once and are equivalent to a multiresolution decomposition image of Level 1. Image 505 is a low-frequency component image, image 506 is a high-frequency component image in the X direction, image 507 is a high-frequency component image in the Y direction, and image 508 is a high-frequency component image in the diagonal direction.

The image 505 is an image obtained by reducing the resolution of the image 501 in FIG. 5A by ½, in which the patterns 502, 503, and 504 of the current image 501 are still visible as identifiable patterns 509, 510, and 511. On the other hand, in the image 506 as the high-frequency component in the X direction, only edges of the patterns 502 and 504 of the current image 501 in the Y direction are visible as pattern 512 and pattern 515. As for the pattern 503 of the current image 501, pattern 514 as an aggregate of contours of individual black dots constituting the pattern 503, and pattern 513 as pattern edges of the aggregate of black dots in the X direction are visible. In the image 507 as the high-frequency component in the Y direction too, similarly only pattern 516 and pattern 519 that are edges of the patterns 502 and 504 of the current image 501 in the X direction are visible and as for the pattern 503 of the current image 501, pattern 517 as an edge of the entire pattern in the Y direction and pattern 518 as an aggregate of contours of black dots in the X direction are visible. In the image 508 as the high-frequency component in the diagonal direction, patterns 520, 521, and 523 as edges of the patterns 502, 503, and 504 of the current image 501 in the diagonal direction, and pattern 522 as an aggregate of contours of black dots in the diagonal direction are visible.

FIG. 5C shows an image obtained by discrete wavelet transformation of the image in FIG. 5B. This image is an image obtained by down-sampling the resolution of the low-frequency component image 505 by ½ and decomposing it into a high-frequency component and a low-frequency component and it is equivalent to Level 2 multiresolution decomposition image of the current image 501. Image 524 is a low-frequency component image, image 525 is a high-frequency component image in the X direction, image 526 is a high-frequency component image in the Y direction, and image 527 is a high-frequency component image in the diagonal direction. Since their resolution is ¼ of the resolution of the current image 501, the high-frequency patterns of these images are blurred and almost invisible. For example, in the low-frequency component image 524, the black dots of the pattern 503 of the current image 501 are mostly blurred and look like a virtually monolithic pattern. In addition, in the high-frequency component images 525, 526 and 527, the pixel intensities of high-frequency patterns like the patterns 514, 518 and 522 as seen in FIG. 5B are lost and only simple pattern edges are visible.

Here, in the patterns appearing in the high-frequency component image 527 in the diagonal direction in FIG. 5C, a pattern whose edges in the diagonal direction are all visible is only the aggregate of pattern edges 528 enclosed by dotted line. In the first embodiment, in the high-frequency component image 527, a first reference pattern is extracted in this way by extracting a region in which all pattern edges in the diagonal direction are visible. As mentioned earlier, when discrete wavelet transformation is performed on image data once, the resolution is reduced by ½. Extracting pattern edges from an image with a reduced resolution means seeking edge information on longer period repetitive patterns than extracting pattern edges directly from the current image. Regarding a repetitive pattern included in image data, when it is a longer period pattern, usually it is more likely to be a unique pattern. Therefore, a pattern constituted by pattern edges extracted from a sufficiently degenerated multiresolution decomposition image is generally a unique pattern. After the coordinates of a pattern edge are identified, the die inside coordinates of the pattern edge in the current image 501 can be determined simply by multiplying the die inside coordinates of the pattern edge in the multiresolution decomposition image by 2N (N denotes degeneracy level). The die inside coordinates of the first reference pattern are thus identified. The pattern shape and coordinates (coordinates of a cutout image which will be explained later) are associated with the corresponding swath channel information and registered in a recipe. When registration of first reference patterns for all the swath channel die images of the wafer center die is completed, Step 302 is ended. In the above explanation, a first reference pattern is determined by extracting pattern edges from a multiresolution decomposition image of Level 2, but instead a higher level multiresolution decomposition image may be used to extract a first reference pattern. Also, a first reference pattern may be determined by extracting a region in which pattern edges in the X and Y directions are visible in the high-frequency component images in the X and Y directions.

After the recipe setting steps indicated by the dotted line frame in FIG. 3 are ended, imaging by stage scanning and light irradiation is started at Step 303. The subsequent steps correspond to main inspection and the image of the die as the object of defect inspection (second swath image) is acquired by the subsequent steps. According to the procedure shown in the top diagram in FIG. 2, imaging is started from the left bottom corner on the sheet and movement to the rightmost die in the same row is made. After the second swath image is taken, if the light irradiation position for imaging does not reach the dies in the uppermost row of the wafer (Step 309 for decision in FIG. 3), the stage is moved upward on the sheet in the Y direction (Step 310 in FIG. 3) and stage scanning and light irradiation are performed in the reverse direction to acquire a second swath image. After the second swath image is acquired for each line at Step 304, the second swath image is transmitted to the image processor 110 on a basis per swath channel image.

Step 305 is a step to correct the position error of a second swath image for each swath channel image. The image processor 110 cuts a swath channel image of the second swath image into images die by die in the longitudinal direction and the swath channel die image is compared with the first reference pattern by template matching. By this comparison, the die inside coordinates of a pattern equivalent to the first reference pattern in the swath channel die image are determined for each die. Furthermore, the amount of position error in the X and Y directions of the swath channel die image of a given die (ΔX and ΔY which will be explained later) is calculated. The calculated amount of position error is stored in the memory in the image processor 110. The software to perform template matching is stored in the storage unit 113 in the same way. For execution, the software is called by the processor 112 in the image processor 110 and then stored in the memory in the image processor 110 and executed.

Figure 6A:
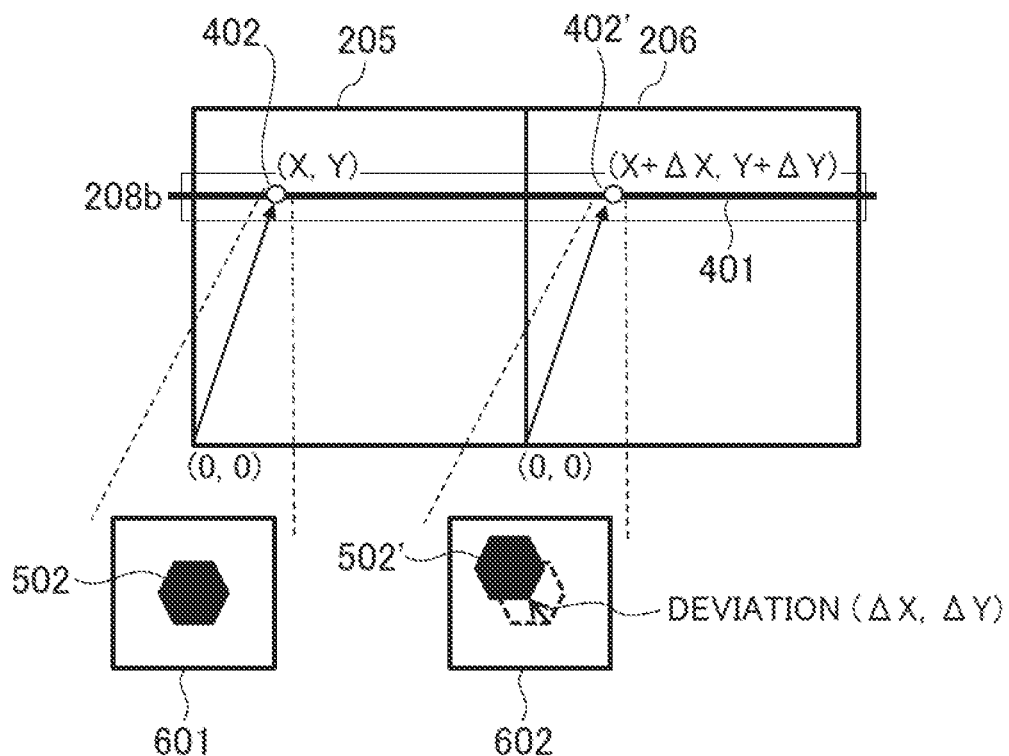
FIG. 6A is a schematic diagram that shows the relation between a first reference pattern and a swath channel image.

FIG. 6A schematically shows the relation between the first reference pattern and the amount of position error. Die 205 is a wafer center die, die 206 is a die adjacent to it on the right and swath 208b extends across the two dies. Swath channel 401 is one of the swath channels with 1024 pixels that constitute the swath 208b and the first reference pattern 402 is extracted from a swath channel die image of the wafer center die 205. Since the same pattern is formed in the adjacent die 206 as in the wafer center die 205, the same pattern 402' as the first reference pattern 402 is formed in the swath channel die image of the die 206, but the pattern 402' in the swath channel 401 image is in a slightly deviated position from the first reference pattern due to the stage mechanical accuracy in swath image acquisition or another reason. Enlarged views of the first reference pattern 402 and pattern 402' are shown in the lower part of FIG. 6A. In these enlarged views, the first reference pattern is shown as a pattern 502 in the cutout image 601. Similarly, the pattern 402' is shown as a pattern 502' deviated from the center of the cutout image 602. The pattern indicated by dotted line represents the first reference pattern 502 registered in the recipe and the pattern 502' is deviated from the pattern 502 by ΔX, ΔY. In other words, when the die inside coordinates of the first reference pattern is expressed as (X, Y), the pattern die inside coordinates of the pattern 402' in the die 206 are expressed as (X+ΔX, Y+ΔY).

Figure 6B:
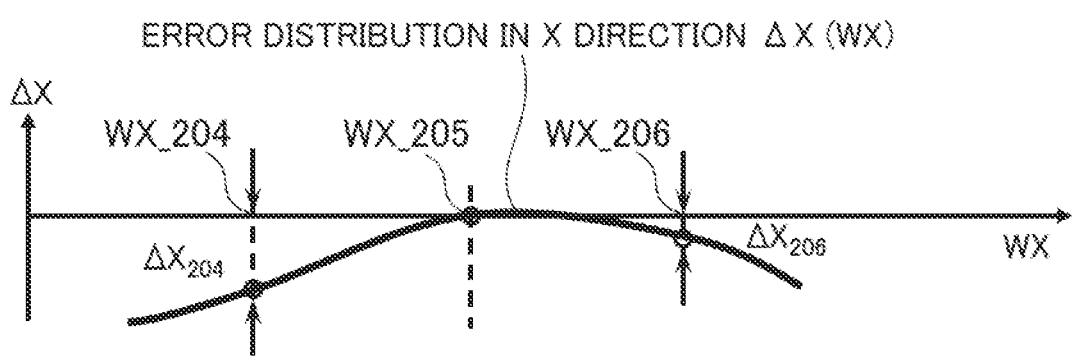
FIG. 6B is a schematic diagram that shows the relation between die inside coordinates and position error distribution.

Since the values of ΔX and ΔY are different among individual dies, a distribution quantity on the swath channel image is used for ΔX and ΔY. FIG. 6B conceptually shows a distribution of position errors in the X direction for the swath channel 401. In the figure, the vertical axis represents position error ΔX in the X direction and the horizontal axis represents coordinates WX in the X direction of the swath channel image and coordinates WX_204, WX_205, and WX_206 are coordinates obtained by transforming the same position in the die inside coordinates of each die as the X coordinate of the first reference pattern, into coordinates of the swath channel image. With respect to coordinate X_204, namely die inside coordinate of the first reference pattern in the die 204, there is position error $\Delta X_{204}$ in the X direction; and with respect to coordinate X_206, namely die inside coordinate of the first reference pattern in the die 206, there is position error $\Delta X_{206}$ in the X direction. Coordinate X_205 is the coordinate of the first reference pattern in the wafer center die 205 and since the coordinate represents the position at which the first reference pattern has been extracted, there is no position error. Since the amount of position error (ΔX, ΔY) is a discrete quantity that is determined for each die, the solid line indicated as "error distribution in X direction ΔX(WX)" should be actually expressed not by a line but by dots. However, for easy understanding, the amounts of errors are expressed by a solid line connecting the coordinates X_204, X_205, and X_206, in the lower diagram of FIG. 6.

Going back to the explanation of FIG. 3, at Step 305, ΔX and ΔY are determined for all swath channel images present in the acquired swath image (for example, in the i-th line). Specifically, a first reference pattern corresponding to an acquired swath channel image is read from the recipe and an image of the same size as the above cutout image is cut out from the swath channel image. Then, template matching with the first reference pattern as a template is performed on the cutout image to determine ΔX and ΔY as explained above with reference to FIG. 6A. At the next step 306, position error correction of the swath image in the i-th line is made. Specifically, for each of the swath channel images constituting the swath image in the i-th line, the difference between the die inside coordinates of the pixels of the swath channel image and the above ΔX and ΔY is calculated to correct the position error.

After position error correction for the entire swath image in the i-th line is ended, at Step 307 the image processor 110 performs comparison processing using the swath channel die images of the inspection die and the swath channel die images of the adjacent die and a defect candidate position is detected by comparison between different images. At Step 308, the information on the detected defect candidate position is transmitted to the storage unit 113 and stored. Since the swath channel die image used for comparison processing at this step has already been subjected to position error correction, the position accuracy is much higher than that of a defect candidate position detected by the conventional method.

At Step 309, a decision is made as to whether stage scanning in the Y direction is ended or not and if it is ended, the flow ends there. If it is not ended, the controller 109 moves the stage 104 in the +Y direction (upward in the top diagram of FIG. 2) for one swath (Step 310). Then, the step to acquire the swath image in the i+1-th line is carried out (Step 304) and the flow from Step 305 to Step 310 is continued. Although the center die of the wafer map is selected as the reference die in the first embodiment, theoretically any die in the wafer may be used as a reference die.

Second Embodiment

Although the first embodiment has been described as an embodiment in which the swath image is corrected for each swath channel image, using the reference pattern acquired for each swath channel image from the wafer center die, there are cases that the coordinates of the wafer center die have some position error. In many cases, this error is caused by the origin of the die inside coordinates that is deviated for some reason (there is an origin offset). In the second embodiment, an explanation will be made of the configuration in which the above origin offset is calibrated using a second reference pattern specified by the user of the device. Since the general configuration of the inspection device according to the second embodiment is the same as shown in FIG. 1, description of the internal configuration of the device is omitted. In the explanation given below, reference will be made to the drawings that have been used for explanation of the first embodiment, as necessary.

Figure 7:
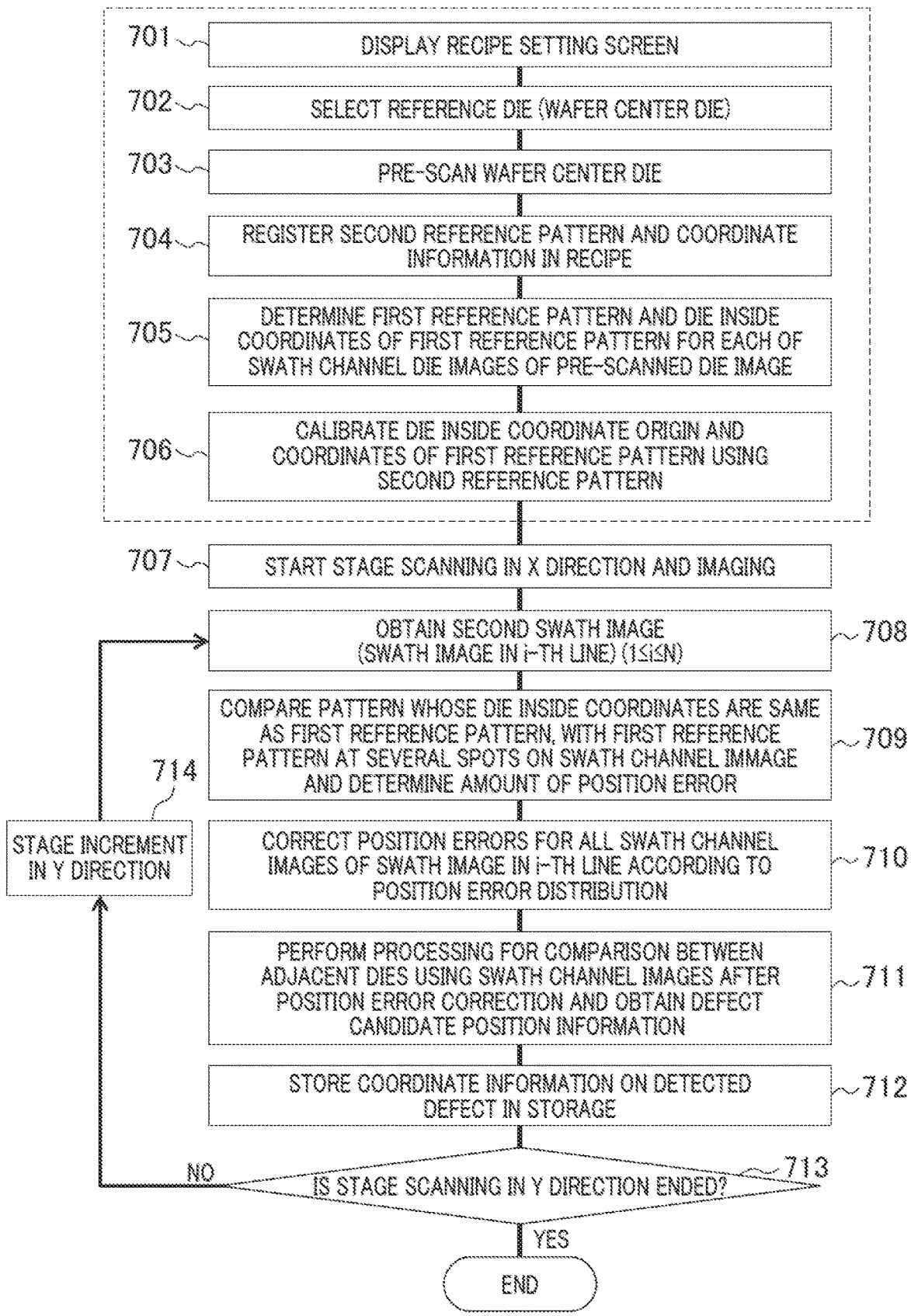
FIG. 7 is a flowchart of defect inspection according to a second embodiment.

FIG. 7 shows an operation flow of the inspection device according to the second embodiment. Like the first embodiment, the steps enclosed by dotted line indicate a recipe setting flow and the same recipe conditions can be used for wafers on which the same pattern is formed. Therefore, once the recipe setting steps are carried out, it is unnecessary to carry out the recipe setting steps again.

Figure 8:
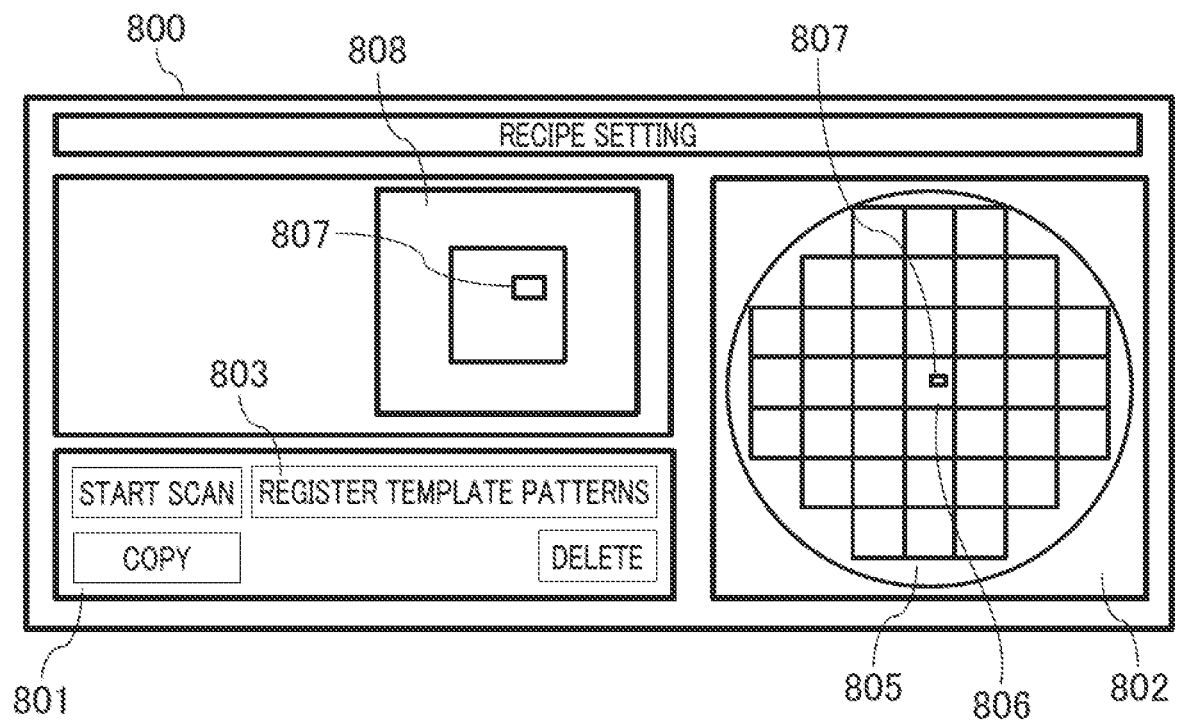
FIG. 8 shows a recipe setting screen of the defect inspection device according to the second embodiment.

A recipe setting screen is displayed at Step 701. FIG. 8 shows a configuration example 800 of the recipe setting screen. This screen is shown on the display of the control PC 111 and functions as a user interface. A start button 803 and other buttons for a template pattern registration screen are arranged in an area 801. A wafer map 805 appears on a wafer map display screen 802 and a total of 37 dies expressed by squares are displayed in a matrix pattern on the wafer map 805. Reference number 807 denotes a second reference pattern which will be explained later.

Figure 9:
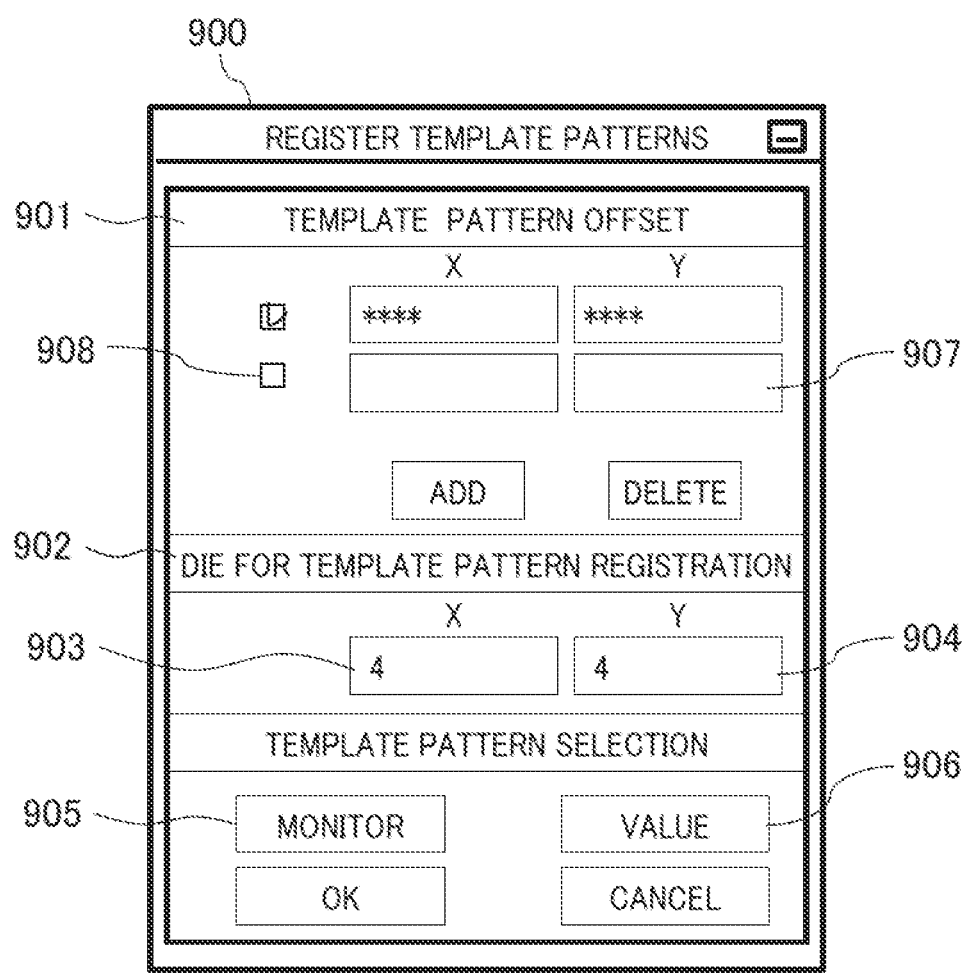
FIG. 9 shows a template pattern setting screen of the defect inspection device according to the second embodiment.

At Step 702 in FIG. 7, a reference die and a second reference pattern (template pattern) and coordinates are set. When a start button 803 for the template pattern setting screen shown on the recipe setting screen 800 in FIG. 8 is pressed, the template pattern registration screen 900 shown in FIG. 9 pops up as another screen. A reference die to select a template is set on a reference die setting screen 902 displayed on the template pattern registration screen 900. In order to set it, position information on a die shown on the wafer map 805 is entered in an X coordinate input box 903 and a Y coordinate input box 904. FIG. 9 shows that the values (4, 4) corresponding to the matrix coordinates of the center die on the wafer map 805 (the fourth die from left in the X axis direction and the fourth die from bottom in the Y axis direction) are entered.

At Step 703 in FIG. 7, the wafer center die 806 is pre-scanned to acquire a swath image of the center die. Next, at Step 704, the template pattern and coordinate information are registered in the recipe. After input, as a monitor button 905 is pressed, an enlarged image of the reference die appears on a die display screen 808 in FIG. 8 and the operator of the device specifies an appropriate template pattern 807, referring to the enlarged image of the die concerned and enters the coordinate information on the pattern in X and Y input boxes shown in an offset setting area 901. Theoretically a position error can be corrected by setting one template pattern, but the accuracy in position error correction is increased by setting two or more template patterns. Therefore, blank X and Y input boxes 907 are additionally displayed by pressing the "ADD" button on the template pattern setting screen shown in FIG. 9. The input boxes can be deleted. In that case, by entering a checkmark in the checkbox on the left of the input boxes and pressing the "Delete" button, the input boxes are deleted and the registered template pattern coordinate information is deleted. After input, by pressing the OK button, input to set the template pattern and coordinates is completed. The input template pattern and coordinate information are stored in the recipe in the storage unit 113.

At Step 705, a first reference pattern is extracted using a swath image of the pre-scanned wafer center die. Since the processing at this step is the same as the processing at Step 302 in FIG. 3 that has been explained in the first embodiment, its explanation is omitted.

At Step 706, the die inside coordinates of each die and the coordinates of the first reference pattern are corrected using the second reference pattern. As mentioned above, the coordinate information on the defect detected by the defect inspection device is used by an external observation device such as a review SEM to acquire an enlarged image of the defect. On the other hand, the origin of the die inside coordinates that is recognized by an optical inspection device often disagrees with the origin of the die inside coordinates that is recognized by a review SEM. Since the defect candidate position acquired by the defect inspection device is expressed by die inside coordinates, if the coordinate origins disagree, the defect candidate position would not be detected correctly.

Figure 10:
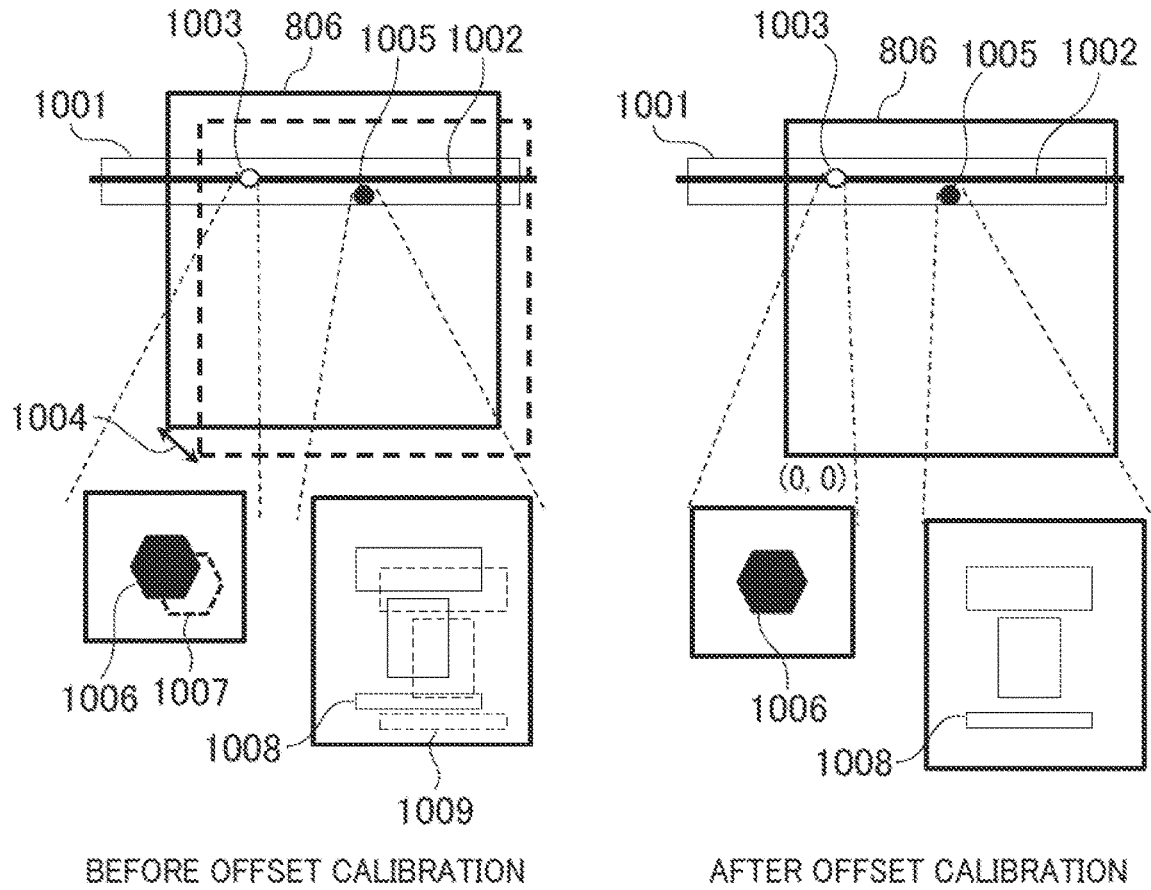
FIG. 10 is a conceptual diagram that shows origin calibration of die inside coordinates using a second reference pattern.

FIG. 10 is a conceptual diagram that shows origin offset calibration of die inside coordinates using the second reference pattern. The diagram shown on the left indicates a state before offset calibration and the diagram shown on the right indicates a state after offset calibration. First, the left diagram in FIG. 10 is explained below. In the left diagram, the image of the wafer center die 806 that has been acquired at Step 703 is shown by a square indicated by solid line and expressed by the die inside coordinates of the optical inspection device. On the other hand, the square indicated by broken line schematically represents the image of the wafer center die 806 that is expressed by the die inside coordinates of an external observation device, for example, a review SEM. There is a difference 1004 between both the origins. Reference number 1001 denotes one swath image of the die image and reference number 1002 denotes one swath channel image. When an image of the same position as the position of the first reference pattern 1006 extracted from the swath channel image 1002 is taken by the external observation device, the first reference pattern would be observed at an offset position 1007 (indicated by broken line) due to the difference between the origins, but the optical inspection device cannot detect the first reference pattern at the position 1007. Therefore, the optical inspection device cannot detect the amount of difference and thus the origin offset cannot be calibrated using the first reference pattern.

On the other hand, regarding the second reference pattern 1008, since its coordinate information is registered in the offset setting area 901 in FIG. 9, the optical inspection device can extract the difference between the coordinates of the second reference pattern expressed by die inside coordinates of the inspection device, and the coordinates registered by the user. Reference number 1008 represents the second reference pattern extracted from the swath channel image taken by the optical inspection device (expressed by the die inside coordinates of the optical inspection device) and the FIG. 1009 indicated by broken line represents the second reference pattern whose position is expressed using the coordinate information registered in the offset setting area 901 in FIG. 9. The processor 112 calculates the amount of difference between the coordinates of the solid line pattern 1008 (second reference pattern) and the coordinates of the broken line pattern 1009 (registered coordinates), recognizes the offset of the die inside coordinate origin by the amount of difference and calibrates the origin. Consequently, as seen in the diagram on the right in FIG. 10 that shows the state after offset calibration, the origin position error is resolved and the die inside coordinate origin of the optical inspection device and the die inside coordinate origin of the external observation device can coincide. As the die inside coordinate origin is calibrated, the coordinates of the first reference pattern are also calibrated.

If a plurality of second reference patterns are set, the average of position errors of the second reference patterns is used to correct the origin position. Needless to say, a more accurate calibration result can be obtained by the use of two or more second reference patterns. The recipe setting flow is thus completed. The main inspection starts from Step 702, and Step 707 and the subsequent steps are the same as in the first embodiment, so their explanation is omitted.

In the coordinate information on the defect candidate position as acquired using the defect inspection device or defect inspection method according to this embodiment, the position difference from the origin of the coordinate system of the observation device is mostly eliminated. Therefore, when the defect coordinates extracted by the defect inspection device is observed through the observation device, the phenomenon that the defect does not appear in a field of view of the observation device can be reduced. Consequently, the step to search a field of view in the observation device can be omitted or the time required to search a field of view can be shortened, so that the observation throughput of the observation device can be improved. In other words, this embodiment can realize a defect inspection with higher interoperability with the external observation device than the first embodiment.

Third Embodiment

The second embodiment has been described as an embodiment in which the device user selects a second reference pattern on an image and registers its coordinates in the recipe. The third embodiment is explained below as an embodiment in which a second reference pattern is extracted from an image acquired by a review SEM and a position error of a swath channel image acquired by the optical inspection device is corrected.

Figure 11:
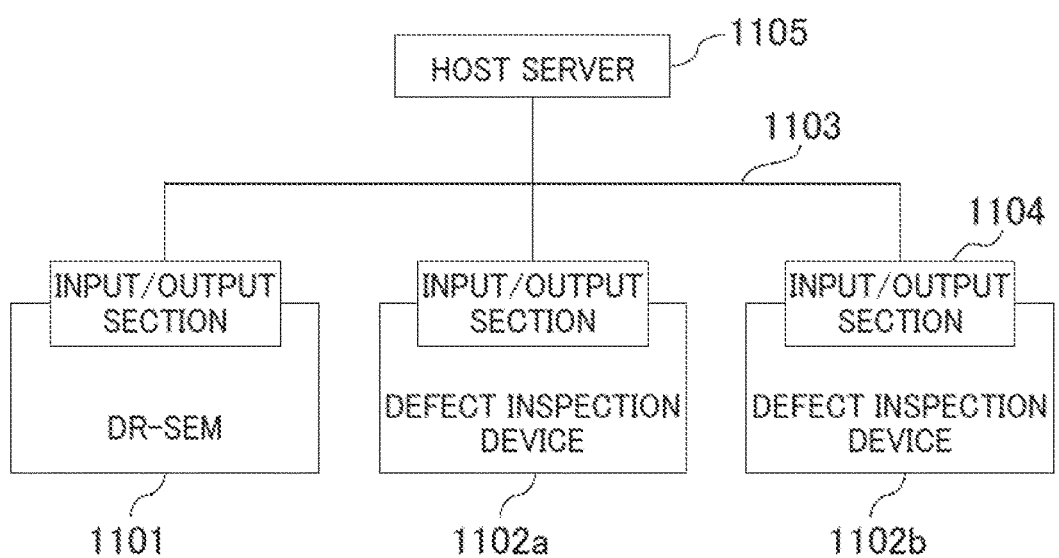
FIG. 11 is a configuration diagram that shows the configuration of a defect inspection system according to a third embodiment.

FIG. 11 is a schematic diagram that shows the relation of connection between a review SEM 1101 as an external observation device and a defect inspection device 1102. In the configuration shown in FIG. 11, one review SEM 1101 and two or more defect inspection devices 1102 are connected to a host server 1105 via a network 1103 by wire or wirelessly. For the convenience of explanation, the defect inspection devices 1102 are distinguished from each other by alphabet suffixes a, b. The review SEM 1101 and defect inspection devices 1102 each have an input/output section 1104 and are connected to the network 1103 through the input/output section 1104. The internal configuration of the defect inspection devices 1102 is the same as the configuration shown in FIG. 1 and the input/output section 1104 is provided in the computer subsystem 102.

FIG. 12 shows an operation flow of the defect inspection device according to the third embodiment. The flowchart shown in FIG. 12 is composed of an advance preparation flow 1220 with the review SEM, a recipe setting flow with the optical inspection device, and a subsequent main inspection flow. These are explained below in sequence.

First, a wafer is loaded onto the review SEM (Step 1201). Then, at Step 1202, a SEM image of the center die of the wafer is taken and at Step 1203, an image equivalent to a second reference pattern is extracted. At this time, it is convenient to set the size of the field of view of the SEM image to be taken to a size almost equal to the swath channel image shown in FIG. 5 or FIG. 6, or FIG. 10 because the second reference pattern can be extracted using the same algorithm as the method for extracting the first reference pattern according to the first embodiment. Like the second embodiment, the second reference pattern may be set manually on the recipe setting screen of the review SEM. In this case, if the second reference pattern (optical microscopic image) that has been set by the optical inspection device in the past is registered in the recipe, the same pattern can be picked up and registered in the recipe. The extracted second reference pattern is transmitted to the host server 1105 together with information on the die matrix coordinates and die inside coordinates. The die inside coordinate information extracted here is die inside coordinates visible in the coordinate system of the review SEM.

At Step 1204, the wafer is unloaded from the review SEM and at Step 1205, the wafer is loaded onto one of the defect inspection devices 1102, for example, 1202a. The loading work or unloading work may be mechanically performed by a wafer transport device or manually performed by the user of the inspection device.

From the next step, the recipe setting flow 1221 with the optical inspection device is started. First, at Step 1206, the control PC 111 of the defect inspection device 1102a calls the die inside coordinates of the second reference pattern from the host server 1105 and registers the coordinates in the storage unit 113. Then, at Step 1207, the wafer center die is pre-scanned to acquire a swath image and a swath channel die image of the center die.

After the swath channel die image of the wafer center die is acquired, at Step 1208 the process of extracting a first reference pattern and a second reference pattern is performed. Since the first reference pattern extraction process is the same as in the first embodiment, detailed description of it is omitted. Regarding the second reference pattern, since the coordinate information in the coordinate system of the review SEM and the pattern shape have already been registered in the recipe, template matching is performed using the second reference pattern shape as a template on the swath channel die image most similar to the registered die inside coordinates to extract the second reference pattern in the coordinate system of the defect inspection device, and the coordinate information. Template matching should be performed in the default range centered on the coordinates registered in the recipe. If the second reference pattern cannot be found, the range should be widened to a swath channel die image in the longitudinal direction of the pixel array or an adjacent swath channel die image to perform template matching again. The first reference pattern and second reference pattern determined by the above steps are registered in the recipe in the storage unit 113 together with the die matrix coordinates, swath image number and swath channel die image number.

At Step 1209, the die inside coordinate origin of the defect inspection device 1102a is calibrated using the amount of difference between the coordinates of the second reference pattern as expressed by the die inside coordinates of the review SEM 1101 and the coordinates of the second reference pattern as expressed by the die inside coordinates of the defect inspection device 1102a. Since this step is the same as Step 706 in FIG. 7, detailed description of the step is omitted.

Step 1210 and the subsequent steps constitute a main inspection flow in which the defect inspection device 1202a acquires an inspection image and conducts a defect inspection. Since these subsequent steps are the same as Steps 303 to 310 in FIG. 3, detailed description of the steps is omitted. In addition, the first reference pattern and second reference pattern that have been registered in the recipe can be repeatedly applied to wafers on which dies with the same pattern are formed.

The defect inspection device or defect inspection method according to this embodiment extracts a second reference pattern from an image acquired by the review SEM, so the position error between the origin of the die inside coordinates of the defect candidate position and the origin of the coordinate system of the observation device is completely resolved. Therefore, this embodiment can realize a defect inspection device that provides higher interoperability with the external observation device than the second embodiment.

The present invention is not limited to the above embodiments but includes many variations. For example, regarding an element of each embodiment, addition of another element, deletion or replacement can be made. The invention is not limited to a configuration that has all the constituent features of each embodiment.

LIST OF REFERENCE SIGNS

100: defect inspection device
101: image acquisition subsystem
102: computer subsystem
103: wafer
104: stage
105: light source
106: detection optical system
107: sensor
108: AD converter
109: controller
110: image processor
111: control PC
112: processor
113: storage unit
207: stage scanning direction for acquisition in swath 208f
208a to 208f: swath images
209: swath channel image
210: sensor

The invention claimed is:

1. A defect inspection method that obtains a swath image of a wafer on which a plurality of dies are formed, reads the obtained swath image as a pixel signal through a plurality of signal channels and acquires information on a candidate position of a defect present in the wafer using the read pixel signal, comprising:
the step of obtaining a first swath image of a die formed in the wafer;
the step of performing prescribed arithmetic processing of a pixel signal (hereinafter called a swath channel image) read from one signal channel among the signal channels and thereby setting at least one first reference pattern for each of swath channel die images cut out die by die from swath channel images of the first swath image;
the step of obtaining a second swath image of the wafer;
the step of comparing a pattern whose die inside coordinates are the same as the first reference pattern in a swath channel image of the second swath image, with the first reference pattern at two or more spots on the same swath channel image included in the second swath image and thereby determining a distribution of position errors between the first swath image and the second swath image;
the step of correcting a position error of the second swath image with respect to the first swath image using the determined position error distribution; and
the step of determining a defect candidate position of the wafer by conducting comparison inspection using the swath image for which the position error is corrected.

2. The defect inspection method according to claim 1, wherein for the prescribed arithmetic processing, pattern edge extraction is performed using a multiresolution decomposition image of a swath channel image of the first swath image.

3. The defect inspection method according to claim 2, wherein a high-frequency component image of Level 2 or less is used as the multiresolution decomposition image.

4. The defect inspection method according to claim 1, comprising:
the step of setting a second reference pattern to calibrate die coordinates in the first swath image according to prescribed reference coordinates; and
the step of calculating a position error amount of the first swath image with respect to the reference coordinates by comparing the second reference pattern with a pattern equivalent to the second reference pattern that is included in the first swath image, and correcting the coordinates of the first reference pattern according to the reference coordinates.

5. The defect inspection method according to claim 4, wherein
images obtained by detection of scattering light or reflected light are used as the first swath image and the second swath image, and
a coordinate system of a scanning electron microscope type defect review device is used for the reference coordinates.

6. A defect inspection device that acquires information on a candidate position of a defect on a wafer on which a plurality of dies are formed, comprising:
an image acquisition subsystem that acquires a swath image of the wafer;
a plurality of signal channels that output the acquired swath image as a pixel signal; and
a computer subsystem that processes the pixel signal and acquires information on the candidate position of the defect,
the computer subsystem:
performs prescribed arithmetic processing of a pixel signal (hereinafter called a swath channel image) read from one signal channel among the signal channels in a first swath image acquired of a die formed in the wafer and thereby determines at least one first reference pattern for each of swath channel die images cut out die by die from swath channel images of the first swath image,
for a second swath image acquired by the image acquisition subsystem, compares a pattern whose die inside coordinates are the same as the first reference pattern in a swath channel image of the second swath image, with the first reference pattern at two or more spots on the same swath channel image included in the second swath image and thereby determines a distribution of position errors between the first swath image and the second swath image,
corrects a position error of the second swath image with respect to the first swath image using the determined position error distribution, and
determines the defect candidate position of the wafer by conducting comparison inspection using the second die image for which the position error is corrected.

7. The defect inspection device according to claim 6, wherein
the computer subsystem performs pattern edge extraction using a multiresolution decomposition image of a swath channel image of the first swath image, for the prescribed arithmetic processing.

8. The defect inspection device according to claim 6, wherein
the computer subsystem comprises a memory to store a second reference pattern to calibrate die coordinates in the first swath image according to prescribed reference coordinates and the first reference pattern, and the computer subsystem calculates a position error amount of the first swath image with respect to the reference coordinates by comparing the second reference pattern with a pattern equivalent to the second reference pattern that is included in the first swath image and corrects the coordinates of the first reference pattern according to the reference coordinates.

* * * * *